United States Patent
Thomas et al.

(10) Patent No.: US 7,734,959 B2
(45) Date of Patent: Jun. 8, 2010

(54) OPERATING SYSTEM RECOVERY ACROSS A NETWORK

(75) Inventors: Fred C. Thomas, Fort Collins, CO (US); David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 406 days.

(21) Appl. No.: 11/830,432

(22) Filed: Jul. 30, 2007

(65) Prior Publication Data

US 2009/0034543 A1 Feb. 5, 2009

(51) Int. Cl.
*G06F 11/00* (2006.01)
(52) U.S. Cl. ...................................... 714/38
(58) Field of Classification Search ........................ None
See application file for complete search history.

(56) References Cited

U.S. PATENT DOCUMENTS

| | | | |
|---|---|---|---|
| 5,142,680 A * | 8/1992 | Ottman et al. .............. 717/176 |
| 5,418,918 A | 5/1995 | Vander Kamp et al. |
| 5,715,462 A * | 2/1998 | Iwamoto et al. .............. 717/173 |
| 5,727,213 A | 3/1998 | Vander Kamp et al. |
| 6,016,402 A | 1/2000 | Thomas et al. |
| 6,085,318 A | 7/2000 | Vander Kamp et al. |
| 6,317,879 B1 * | 11/2001 | Jacobson et al. ............. 717/127 |
| 6,324,644 B1 * | 11/2001 | Rakavy et al. ................. 713/1 |
| 6,915,420 B2 | 7/2005 | Hensley |
| 6,948,099 B1 * | 9/2005 | Tallam ........................ 714/38 |
| 6,993,642 B2 * | 1/2006 | Burkhardt et al. .............. 713/1 |
| 6,993,649 B2 | 1/2006 | Hensley |
| 7,017,039 B2 | 3/2006 | Hensley |
| 7,555,674 B1 * | 6/2009 | Wang .......................... 714/15 |
| 2002/0069245 A1 * | 6/2002 | Kim .......................... 709/203 |
| 2005/0204199 A1 * | 9/2005 | Harper et al. ................. 714/38 |

OTHER PUBLICATIONS

"SureBoot is Revolutionary"; SureBoot website; Copyright 2003; http://www.sureboot.com/technology.html.

* cited by examiner

*Primary Examiner*—Michael C Maskulinski

(57) ABSTRACT

A system comprises a first network device and a second network device coupled via a network to the first network device. The first network device initiates a recovery across the network of an operating system of the second network device.

17 Claims, 1 Drawing Sheet ously, as shown. The operating systems 129, 133, and 135 are stored on the computer-readable medium 164 of the respective network device.

OPERATING SYSTEM RECOVERY ACROSS A NETWORK

BACKGROUND

A computing entity (e.g., computer, network-attached storage device, etc.) generally requires a correctly functioning operating system for the computing entity to perform its intended tasks. If the operating system crashes, the storage medium on which the operating system becomes inoperative, or for any of a variety of other reasons, the computing entity may function erratically, or not function at all.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

By way of definition, the term "cache agent" is used in this disclosure to refer to any logic that comprises cache memory. Examples of a cache agent comprise a processor with a cache subsystem, an input/output device with a cache subsystem, etc.

DETAILED DESCRIPTION

Figure 1:
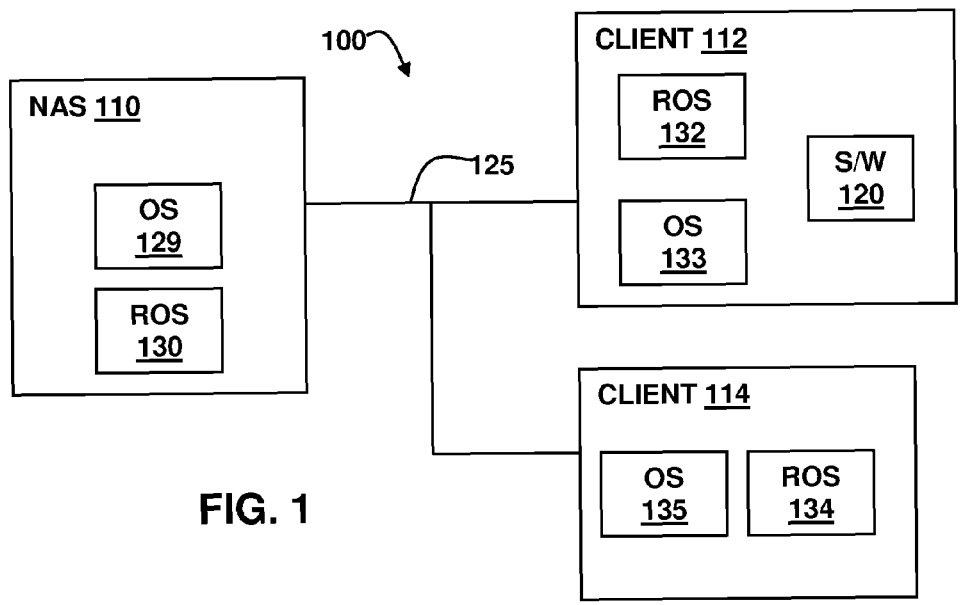
FIG. 1 shows a system in accordance with various embodiments.

FIG. 1 shows a system 100 in accordance with various embodiments. As shown system 100 comprises various network devices 110, 112, and 114 coupled together via a network 125. Although three network devices 110, 112, 114 are illustrated in the example of FIG. 1, any number of network devices can be provided. The network 125 may comprise a local area network (LAN), a wide area network (WAN), a wired network, a wireless network, etc. In some embodiments, the network 125 comprises the Internet.

Each network device 110, 112, 114 comprises a device capable of communicating with other network devices over the network 125. Each network device may comprise a computer (e.g., server, desktop computer, portable computer, etc.), a storage device, or any other type of network device on which an operating system executes. In the example of FIG. 1, two of the network devices 112 and 114 are labeled as client devices and network device 110 comprises a network-attached storage (NAS) device. The NAS device 110 comprises volatile and/or non-volatile storage (e.g., random access memory, hard disk drive, Flash memory, etc.) on which information is stored by any of the client devices 112, 114.

Figure 2:
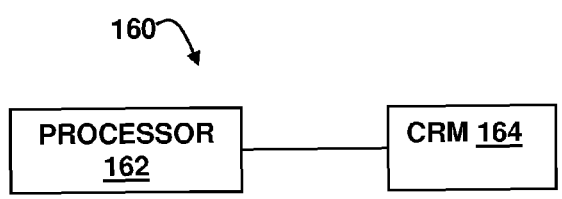
FIG. 2 shows a block diagram usable to implement any of the devices depicted in FIG. 1.

FIG. 2 illustrates a hardware architecture 160 which is applicable to any or all of the network devices 110-114 of FIG. 1. As shown in FIG. 2, the architecture 160 comprises at least a processor 162 coupled to a computer-readable medium (CRM) 164. The computer-readable medium 164 comprises volatile memory (e.g., random access memory), non-volatile storage (e.g., hard disk drive, compact disk read-only memory (CD ROM), read-only memory (ROM), Flash memory, etc.), or combinations thereof. The storage noted above for the NAS 110 may comprise the CRM 164 of FIG. 2.

Referring to FIGS. 1 and 2, each of the network devices 110-114 comprises an operating system (OS) that is executed by processor 162. The NAS device 110 and client devices 112 and 114 have operating systems 129, 133 and 135, respectively, as shown. The operating systems 129, 133, and 135 are stored on the computer-readable medium 164 of the respective network device.

It is possible that a network device's operating system fails (e.g., becomes corrupted) or the computer-readable medium 164 on which the operating system is stored fails thereby rendering the operating system less than fully functional. In some such situations, the operating system may be completely inoperative. For any of such reasons, or for no reason at all, a user may desire to cause an operating system recovery process to occur.

In accordance with various embodiments, an operating system recovery is initiated across the network 125 between network devices. In one such embodiment, a first network device initiates a recovery across the network of the operating system of a second network device. For example, client 112 can be used to initiate a recovery across network 125 of the operating system 129 of the NAS 110 or to initiate a recovery across network 125 of the operating system 135 of the client 114.

Various embodiments use a recovery operating system (ROS) to recover a network device's operating system. A recovery operating system pertains to a particular operating system to which the recovery operating system will be used to recover. Thus, the operating system 129 of NAS 110 has a corresponding recovery operating system used to recover the NAS' operating system. The NAS's operating system's recovery operating system may be stored on the NAS (recovery operating system 130) or may be stored on one or more of the clients 112, 114 (recovery operating systems 132, 134, respectively). In some embodiments, an operating system may have more than one corresponding recovery operating system. For example, the operating system 129 of NAS 110 may have one or more of the recovery operating systems 130, 132, and 134 associated therewith. Similarly, each of the operating systems 133 and 135 of clients 112 and 114 may have one or more associated recovery operating systems stored on the same or different network devices.

A recovery operating system comprises a reduced-size version of the corresponding operating system for which it is used to recover. In at least some embodiments, the recovery operating system 130 implements fewer functions and features than a full-blown operating system. As a result, the recovery operating system boots faster and requires less storage space. A recovery operating system comprises some or all of the same user settings as are programmed for the base operating system. Such user settings comprise, for example, a password (e.g., an operating system log-on password), an encryption setting, a display resolution, and a network setting. Each operating system instance may differ from other operating system instances by, for example, one or more of the user settings. Each operating system 129, 133, 135 has a particular configuration of its user settings (as configured by the user) and has at least one corresponding recovery operating system 130, 132, 134 that is of a reduced-size and that retains the same configuration of user settings.

In accordance with some embodiments, a reduced-size operating system is created from a full operational operating by removing various code from the full operational system that is not required for the specific operational functionality of an individual client system. Various embodiments have different levels of culling performed to produce the recovery operating system. Further, in some embodiments, the resulting recovery operating system occupies no more than one-half of the size of the full size operational system. In some embodiments, the resulting recovery operating system occupies no more than one-tenth of the size of the full size operational system.

In some embodiments, a first network device initiates a recovery of a second network device's operating system using a recovery operating system resident on a third network device. For example, client 112 causes the recovery operating system 130 on the NAS 110 to be used to recovery the operating system 135 of client 114.

At least one of the network devices comprises software that is used to determine the health and status of the operating systems of the other network devices in system 100, as well as to generate the recover operating systems 130, 132, 134. Client 112 is shown in FIG. 1 as comprising software 120. Software 120 is stored on that network device's computer-readable medium 164 and is executed by the device's processor 162. In accordance with at least some embodiments, software 120 receives, for example, periodic heartbeat signals or packets from the various network devices. The absence of a heartbeat signal that otherwise would have occurred indicates an error with the network device that should have sent the missing heartbeat signal. Any other technique for client 112 to monitor the status of another network device's operating system is within the scope of this disclosure.

The process by which software 120 generates a recovery operating system version of a base operating system comprises, for example, such acts as reading various operating system files, device drivers, and configuration parameters (e.g., registry information). This process may also comprise storing such information into the recovery operating system. Further, this process comprises retrieving additional information such as hard disk file system type, hard disk partition information, boot loader code, etc. and storing such additional information into the recovery operating system.

Upon detection of an error associated with a network device, client 112 initiates a recovery of the failed operating system across network 125. The network-based operating system recovery comprises determining the location of the recovery operating system that corresponds to the failed operating system. The software 120 maintains a data structure (e.g., a table, a file, etc.) which specifies the location (e.g., by memory location) of the recovery operating system(s) 130, 132, 134 that correspond to each base operating system 129, 133, 135. In some embodiments, the software 120 is used to generate the recovery operating system for each base operating system 129, 133, 135, stores such recovery operating systems at various locations across the network, and updates the data structure with such information. The client 112 initiating the recovery process further comprises causing the corresponding recovery operating system to be transferred across the network 125 and used by the receiving network device (the network device whose operating system is to be recovered) to rebuild its own operating system.

Rebuilding an operating system comprises a process similar to installing an operating system on a blank hard disk drive. For example, the hard disk is formatted and partitioned. The various hardware components of the system are detected and corresponding device drivers are loaded to operate such components. Further, the files comprising the operating system are loaded onto the hard disk drive, the operating system structures such as the registry are configured, and the boot loader is updated.

Figure 3:
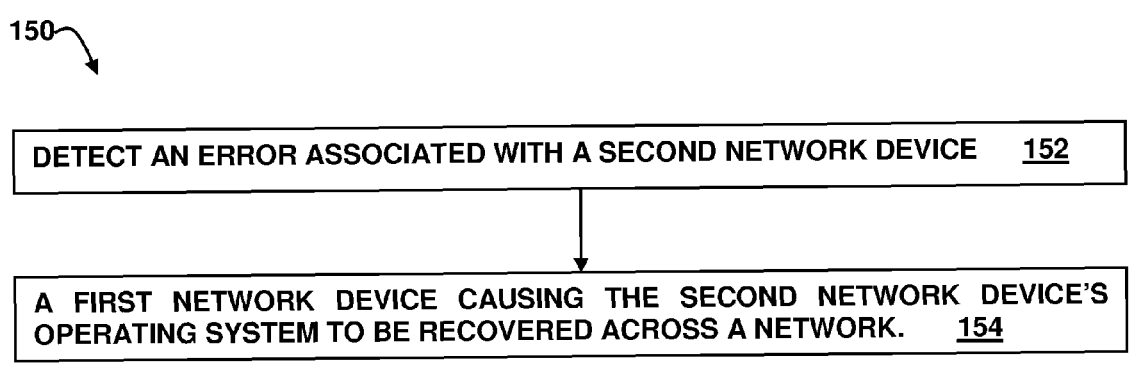
FIG. 3 shows a method in accordance with various embodiments.

FIG. 3 illustrates a method 150 in accordance with various embodiments. At 152, the method 150 comprises a first network device detecting an error associated with a network device. At 154, the method further comprises the first network device causing the second network device's operating system to be recovered across the network 125.

In some embodiments, client 112 executes software 120 which is used to generate and store the recovery operating systems as well as to perform the network-based recovery process described herein. As such, client 112 may be referred to as an "administrator" (or similar term) for this purpose. In other embodiments, more than one network device comprises an instance of software 120 and thus more than one network device can perform the network-based operating system process described herein.

In some embodiments, the recovery operating system may be stored on the same network device as the operating system to be recovered. In such embodiments, before the client 112 causes a recovery operating system to be transferred across the network 125 to the network device with the failed operating system, the client 112 prompts the network device with the failed operating system to recover using a recovery operating system stored on the same network device.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a first network device that uses a recovery operating system to initiate a recovery; and
a second network device coupled via a network to said first network device;
wherein said first network device initiates the recovery across said network of an operating system of the second network device; and
wherein said recovery operating system and the second network device comprise user settings selected from a group consisting of a password, an encryption setting, a display resolution, and a network setting.

2. The system of claim 1 further comprising a third network device having a recovery operating system, said first network device causes the third network device's recovery operating system to be used to recover the second network device's operating system.

3. The system of claim 2 wherein said third network device comprises a network-attached storage device.

4. The system of claim 1 wherein said second network device comprises a network-attached storage device.

5. The system of claim 1 wherein said first network device comprises logic that monitors the status of the second network device's operating system.

6. The system of claim 5 wherein said logic initiates said recovery of said second network device's operating system.

7. The system of claim 1 wherein said recovery operating system has a size that is less than the second network device's operating system.

8. The system of claim 1 wherein said recovery operating system and the second network device comprise identical user settings.

9. A method, comprising:
    a first network device using a recovery operating system to cause a second network's device operating system to be recovered across a network;
    wherein said recovery operating system and the second network device comprise user settings selected from a group consisting of a password, an encryption setting, a display resolution, and a network setting.

10. The method of claim 9 further comprising the first network device detecting an error associated with said second network device.

11. The method of claim 9 wherein the first network device causing the second network device's operating system to be recovered comprises causing a recovery operating system of a third network device to be transferred across the network to the second network device.

12. The method of claim 9 wherein the first network device causing the second network device's operating system to be recovered comprises causing a recovery operating system of a network-attached storage device to be transferred across the network to the second network device.

13. The method of claim 9 further comprising generating the recovery operating system to be used when the first network device causes the second network's device operating system to be recovered across the network, said recovery operating system having the same user settings as the second network's device operating system.

14. A computer-readable medium (CRM) comprising software that, when executed by a processor of a first network device, causes the processor to:
    detect an error in a second network device; and
    initiate a recovery of an operating system of the second network device across a network using a recovery operating system;
    wherein said recovery operating system and the second network device comprise user settings selected from a group consisting of a password, an encryption setting, a display resolution, and a network setting.

15. The CRM of claim 14 wherein said software causes said processor to initiate the recovery by causing a third network device to transfer a recovery operating system from the third network device to the second network device across said network.

16. The CRM of claim 14 wherein said software causes said processor to initiate the recovery by causing a network-attached storage device to transfer a recovery operating system from the network-attached storage device to the second network device across said network.

17. The CRM of claim 14 wherein said software also causes said processor to generate a recovery operating system that comprises user settings that are the same as the user settings of the second network device's operating system.

* * * * *